(12) United States Patent
Liu et al.

(10) Patent No.: US 10,022,925 B2
(45) Date of Patent: Jul. 17, 2018

(54) REUSABLE CASTINGS MOLDS

(71) Applicant: Novartis AG, Basel (CH)

(72) Inventors: Alice Weimin Liu, Alpharetta, GA (US); Gregory L. Herron, Sugar Hill, GA (US)

(73) Assignee: Novartis AG, Basel (CH)

(*) Notice: Subject to any disclaimer, the term of this patent is extended or adjusted under 35 U.S.C. 154(b) by 598 days.

(21) Appl. No.: 14/575,366

(22) Filed: Dec. 18, 2014

(65) Prior Publication Data

US 2015/0174663 A1    Jun. 25, 2015

Related U.S. Application Data

(60) Provisional application No. 61/918,914, filed on Dec. 20, 2013.

(51) Int. Cl.
*B29D 11/00* (2006.01)
*B23B 5/36* (2006.01)
*G02B 1/00* (2006.01)

(52) U.S. Cl.
CPC .......... *B29D 11/00519* (2013.01); *B23B 5/36* (2013.01); *G02B 1/00* (2013.01); *B23B 2215/00* (2013.01); *B23B 2226/45* (2013.01); *Y10T 82/10* (2015.01)

(58) Field of Classification Search
CPC ........ B29D 11/00519; B23B 5/36; G02B 1/00
See application file for complete search history.

(56) References Cited

U.S. PATENT DOCUMENTS

| | | |
|---|---|---|
| 5,195,407 A | 3/1993 | Takeno |
| 5,246,889 A * | 9/1993 | Kasuga ............... C03C 10/0045 106/35 |
| 5,396,821 A | 3/1995 | Okumura |
| 5,417,130 A | 5/1995 | Dorsch |
| 5,508,317 A | 4/1996 | Müller |
| 5,583,163 A | 12/1996 | Müller |
| 5,789,464 A | 8/1998 | Müller |
| 5,849,810 A | 12/1998 | Müller |
| 5,861,114 A | 1/1999 | Roffman |
| 6,122,999 A | 9/2000 | Durazo |
| 6,627,124 B1 | 9/2003 | Herbrechtsmeier |
| 6,800,225 B1 | 10/2004 | Hagmann |
| 7,089,835 B2 | 8/2006 | Bryan |
| 7,153,073 B2 | 12/2006 | Harmand |

(Continued)

FOREIGN PATENT DOCUMENTS

CN    102689252 A    9/2012

OTHER PUBLICATIONS

PCT International search report dated Mar. 10, 2015, International Application No. PCT/US2014/071216, International Filing Date Dec. 18, 2014.

(Continued)

*Primary Examiner* — Mathieu Vargot
(74) *Attorney, Agent, or Firm* — Sheng-Hsin Hu

(57) ABSTRACT

The invention is directed to a reusable mold for making a contact lens and the reusable mold has at least one of the mold halves is made from an oxide glass having a Knoop Hardness less than HK 350. The invention is also directed to a method for making an optical part by single point diamond turning an oxide glass having a Knoop Hardness HK less than 350.

8 Claims, 2 Drawing Sheets

(56) References Cited

U.S. PATENT DOCUMENTS

| | | |
|---|---|---|
| 7,219,409 B2 | 5/2007 | Jecker |
| 7,373,706 B2 | 5/2008 | Savoie |
| 7,384,590 B2 | 6/2008 | Kelly |
| 7,387,759 B2 | 6/2008 | Kelly |
| 8,015,902 B2 | 9/2011 | Hyatt |
| 8,163,206 B2 | 4/2012 | Chang |
| 8,694,133 B2 | 4/2014 | Mann |
| 2004/0113299 A1 | 6/2004 | Hosoe |
| 2011/0102925 A1* | 5/2011 | Harris ............... B24B 1/005 359/883 |

OTHER PUBLICATIONS

PCT Written Opinion of the International Searching Authority dated Mar. 10, 2015, International Application No. PCT/US2014/071216, International Filing Date Dec. 18, 2014.
Authors: Jamie Leigh Beattie Title: The Flycutting of Glass Published: A Thesis in Mechanical Engineering, The Pennsylvania State University, The Graduate School, Dec. 1998.
Authors: Christian Gary Blough Title: Single Point Diamond Turning of Glass Published: Thesis, The University of Rochester, Dissertation Abstracts International (1992), vol. 53-06, Section: B, p. 2948.
Authors: F. Klocke, G. Pongs, B. Bresseler, M. Heselhaus Title: Precision Technologies for Micro-Structuring of Glass Published: CIRP Seminar on Micro and Nano Technology—2003.
Data Sheet, Schott, Optical Glass, 2012.
Data Sheet, Hoya, Master Optical Glass, 2012.
Data Sheet, Ohara, Glass Data, 2012.
Material Safety Data Sheet, Glass Type: N-BK7, 2005.
Material Safety Data Sheet, Glass Type: N-FK5, 2005.
Material Safety Data Sheet, Product Type: N-PK52A, 2011.
Material Safety Data Sheet, Product Type: N-FK51A, 2011.
Material Safety Data Sheet, Glass Type: P-PK53, 2006.
Christian Gary Blough, "Single Point iamond Turning of Glass", The Smithsonian/NASA, Astrophysics Data System, The University of Rochester, 1992, Source: Dissertation Abstracts International, vol. 53-06, Section: B; Abstract from p. 2948.

* cited by examiner

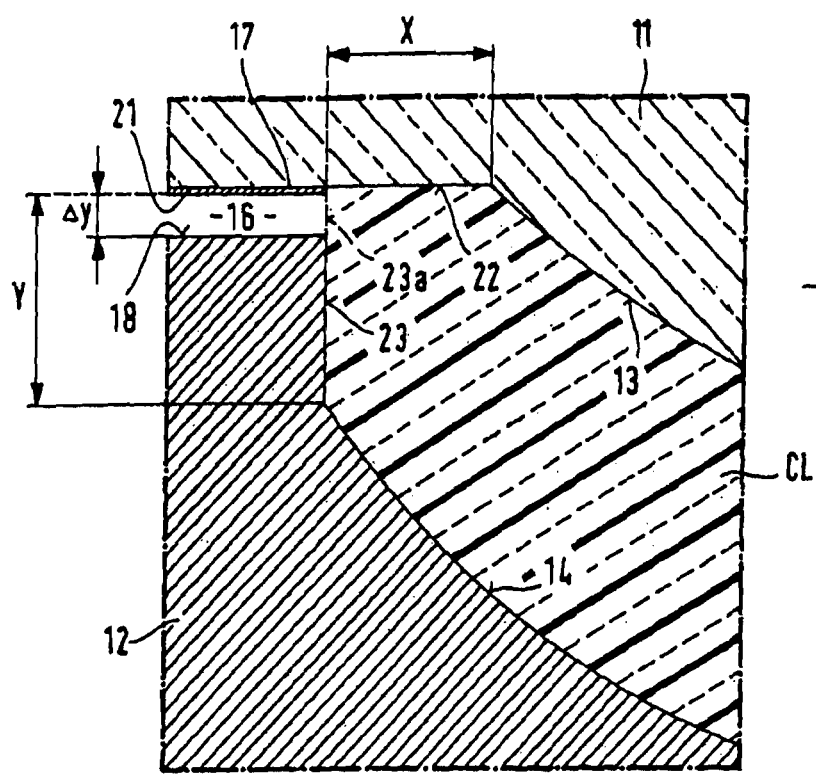

REUSABLE CASTINGS MOLDS

This application claims the benefit under 35 USC § 119 (e) of U.S. provisional application No. 61/918,914 filed 20 Dec. 2013, incorporated by reference in its entirety.

BACKGROUND

A great effort has been made to develop technologies for cast molding of hydrogel contact lenses with high precision, fidelity and reproducibility and at low cost. One of such manufacturing technologies is the so-called Lightstream Technology™ (Alcon) involving reusable molds and curing a lens-forming composition under a spatial limitation of actinic radiation (U.S. Pat. Nos. 5,508,317, 5,583,163, 5,789,464, 5,849,810, and 8,163,206). The Lightstream Technology™ for making contact lenses have several advantages. For example, reusable quartz/glass molds or/and reusable plastic molds, not disposable plastic molds, can be used, because, following the production of a lens, these molds can be cleaned rapidly and effectively of the uncrosslinked monomer or prepolymer and other residues, using a suitable solvent and can be blown dried with air. Disposable plastic molds inherently have variations in the dimensions, because, during injection-molding of plastic molds, fluctuations in the dimensions of molds can occur as a result of fluctuations in the production process (temperatures, pressures, material properties), and also because the resultant molds may undergo non-uniformly shrinking after the injection molding. These dimensional changes in the mold may lead to fluctuations in the parameters of contact lenses to be produced (peak refractive index, diameter, basic curve, central thickness etc.) and to a low fidelity in duplicating complex lens design. By using reusable molds which are produced in high precision, one can eliminate dimensional variations inherently presented in disposable molds and thereby variation in contact lenses produced therefrom. Lenses produced according to the Lightstream Technology™ can have high consistency and high fidelity to the original lens design.

However, the conventional re-usable contact lens mold consists of a quartz convex base curve and a glass concave front curve. The base curve mold is made of individually ground and polished quartz, while the front curve mold is made of high precision pressed and polished glass. The fabrication time for new design quartz base curve molds and glass front curve molds is several months. Such long lead-times result in lengthy development cycles and long lead times for prototyping molds.

Therefore, there is still a need for new reusable molds that can be designed and fabricated in a relatively shorter time.

SUMMARY OF THE INVENTION

The invention, in one respect, relates to a reusable mold for making a contact lens, comprising a first mold half having a first mold surface in contact with a lens forming composition and a second mold half having a second mold surface in contact with the lens forming composition, wherein the first mold half and the second mold half are configured to receive each other such that a cavity is formed between the first mold surface and the second mold surface, wherein the cavity defines the shape of a contact lens to be molded, wherein the lens forming composition is polymerizable and/or crosslinkable by a UV radiation, wherein at least one of the mold halves is made from an oxide glass having a Knoop Hardness (HK) less than 350.

The invention, in another respect, relates to a method for making an optical part comprising the steps of:
(a) selecting an oxide glass material having a Knoop Hardness (HK) less than 350,
(b) single point diamond turning the inorganic amorphous glass with a negative rake angle to achieve an optical part having an optical quality surface.

BRIEF DESCRIPTION OF THE DRAWINGS

FIG. 2 is a detail, indicated by II in FIG. 1, on a greatly enlarged scale.

DETAILED DESCRIPTION OF EMBODIMENTS OF THE INVENTION

Figure 1:
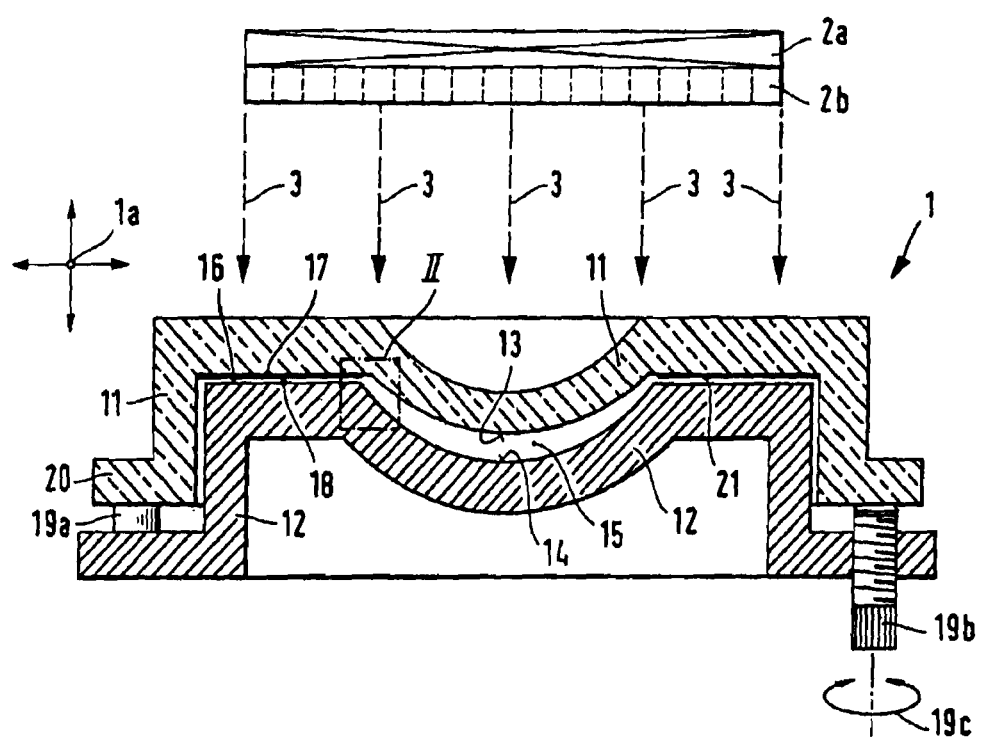
FIG. 1 shows a section through an exemplary embodiment of a casting mould according to the invention in the closed position.

Unless defined otherwise, all technical and scientific terms used herein have the same meaning as commonly understood by one of ordinary skill in the art to which this invention belongs. Generally, the nomenclature used herein and the laboratory procedures are well known and commonly employed in the art. Conventional methods are used for these procedures, such as those provided in the art and various general references. Where a term is provided in the singular, the inventors also contemplate the plural of that term. The nomenclature used herein and the laboratory procedures described below are well known and commonly employed in the art. As employed throughout the disclosure, the following terms, unless otherwise indicated, shall be understood to have the following meanings.

"About" as used herein means that a number referred to as "about" comprises the recited number plus or minus 1-10% of that recited number.

"Optional" or "optionally" means that the subsequently described event or circumstance can or cannot occur, and that the description includes instances where the event or circumstance occurs and instances where it does not.

An "ophthalmic lens" refers to a contact lens and/or an intraocular lens. A "contact lens" refers to a structure that can be placed on or within a wearer's eye. A contact lens can correct, improve, or alter a user's eyesight, but that need not be the case. A "silicone hydrogel contact lens" refers to a contact lens comprising a silicone hydrogel material.

As used in this application, the term "hydrogel" or "hydrogel material" refers to a crosslinked polymeric material which is not water-soluble and can contains at least 10% by weight of water within its polymer matrix when fully hydrated.

A "silicone hydrogel" refers to a hydrogel containing silicone. A silicone hydrogel typically is obtained by copolymerization of a polymerizable composition comprising at least one silicone-containing vinylic monomer or at least one silicone-containing vinylic macromer or at least one silicone-containing prepolymer having ethylenically unsaturated groups.

A "vinylic monomer" refers to a compound that has one sole ethylenically-unsaturated group.

The term "olefinically unsaturated group" or "ethylenically unsaturated group" is employed herein in a broad sense and is intended to encompass any groups containing at least one >C=C< group.

A "spatial limitation of actinic radiation" refers to an act or process in which energy radiation in the form of rays is directed by, for example, a mask or screen or combinations thereof, to impinge, in a spatially restricted manner, onto an area having a well-defined peripheral boundary. A spatial limitation of UV radiation is obtained by using a mask or screen having a radiation (e.g., UV and/or visible light) permeable region, a radiation (e.g., UV and/or visible light) impermeable region surrounding the radiation-permeable region, and a projection contour which is the boundary between the radiation-impermeable and radiation-permeable regions, as schematically illustrated in the drawings of U.S. Pat. No. 6,800,225 (FIGS. 1-11), and U.S. Pat. No. 6,627,124 (FIGS. 1-9), U.S. Pat. No. 7,384,590 (FIGS. 1-6), and U.S. Pat. No. 7,387,759 (FIGS. 1-6), all of which are incorporated by reference in their entireties. The mask or screen allows to spatially projects a beam of radiation (e.g., UV radiation and/or visible radiation) having a cross-sectional profile defined by the projection contour of the mask or screen. The projected beam of radiation (e.g., UV radiation and/or visible radiation) limits radiation impinging on a lens formulation located in the path of the projected beam from the first molding surface to the second molding surface of a mold. The resultant contact lens comprises an anterior surface defined by the first molding surface, an opposite posterior surface defined by the second molding surface, and a lens edge defined by the sectional profile of the projected UV and/or visible beam (i.e., a spatial limitation of radiation). The radiation used for the crosslinking is radiation energy, especially UV radiation (and/or visible radiation), gamma radiation, electron radiation or thermal radiation, the radiation energy preferably being in the form of a substantially parallel beam in order on the one hand to achieve good restriction and on the other hand efficient use of the energy.

A "lens-forming material" refers to a material which can be polymerized and/or crosslinked by actinic radiation to form a contact lens.

Actinic radiation refers to radiation of a suitable form of energy. Examples of actinic radiation includes without limitation light radiation (e.g., UV radiation), gamma radiation, electron radiation, X-ray irradiation, microwave irradiation, thermal radiation and the like.

Further aspects and advantages of the process according to the invention and of the device according to the invention will be seen from the description that follows, in conjunction with the drawings. In the drawing, The device shown in FIG. 1 is designed for the manufacture of contact lenses from a liquid starting material which may be polymerised or crosslinked by UV radiation. It comprises a mould 1 and an energy source 2a, here a UV light source, as well as means 2b for directing the energy provided by the energy source 2a to the mould in the form of an essentially parallel beam. Of course, the energy source 2a and means 2b can also be combined to form a single unit.

The mould consists of two mould halves 11 and 12, each having a curved mould surface 13 and 14 which together define a mould cavity 15, which in turn determines the shape of the contact lens to be manufactured. The mould surface 13 of the upper mould half 11 in the drawing is convex and determines the rear and basic face of the contact lens with the connected edge area; this mould half is normally called the father mould half. Conversely, the mould surface 14 of the other mould half, which is correspondingly called the mother mould half, is concave and determines the front face of the contact lens to be manufactured, likewise with the connected edge area.

The mould cavity 15 is not completely and tightly closed, but in the embodiment illustrated is open around its peripheral edge which defines the edge of the contact lens to be manufactured, and is linked to a relatively narrow annular gap 16. The annular gap 16 is limited or formed by a flat mould wall 17 and 18 on each of the father mould half 11 and the mother mould half 12. In order to prevent complete closure of the mould, spacers, for example in the form of several bolts 19a or 19b, are provided on the mother mould 12, and these interact with a collar or flange 20 of the father mould 11 and keep the two mould halves at such a distance apart that the said annular gap 16 results. As is indicated symbolically in FIG. 1 by the right-hand spacer bolt 19b with a thread, the spacers may also be of adjustable or spring-action formation. In this way, the two mould halves 11, 12 can be moved towards one another during the crosslinking process to balance out leakage, by adjusting the spacers (indicated symbolically by the arrow 19c showing the direction of rotation) or against a spring action. Of course, the mould can be opened and closed in the usual manner, for example by means of a closure unit which is indicated here only by the arrow symbol 1a. Adjustment of the gap between the two mould halves 11, 12 to balance out leakage, may also be effected e.g. using this external closure unit.

It is also conceivable that, instead of the continuous annular gap 16 and the spacers 19a and 19b, a series of segmentous gaps may be provided, the intermediate areas between the individual segment gaps taking over the function of the spacers. Of course, other configurations of mould halves are also conceivable.

On the mould wall 17 in the area of the annular gap 16, there is a mask 21 which is impermeable to the energy form employed, here this is UV light, (or a mask which at least has poor permeability compared with the permeability of the mould), and this mask extends right to the mould cavity 15, and with the exception of the same, screens all the other parts, hollow spaces or areas of the mould 1 that are in contact with or may come into contact with the liquid, uncrosslinked, possibly excess material, from the radiated energy. Partial areas of the lens edge are therefore formed not by a limitation of the material by mould walls, but by a spatial limitation of the radiation or other forms of energy triggering polymerisation or crosslinking.

In the case of UV light, the mask 21 may be preferably a chromium layer, that can be produced by processes known e.g. from photography or UV-lithography. The mask 21 does not necessary have to be fixed; it may also be, for example, removable or exchangeable.

FIG. 2 shows the arrangement of the mould 1 in the transition region between the mould cavity 15 and the annular channel 16 as an enlarged detail. The cavity 15 has here, by way of example, a shape that corresponds to the typical rim geometry of a so-called soft contact lens CL. The cavity rim, and thus the lens rim, is formed here by two wall faces 22 and 23 which are arranged at right angles to one another and are arranged on the male and on the female mould halves 11 and 12 respectively. The width and the height of those two wall faces, and of the rim areas of the contact lens defined by them, are indicated by X and Y respectively. Obviously, the lens rim may in practice also be slightly rounded.

As can be seen clearly, the cylindrical wall face 23 of the female mould half 12 does not extend right up to the flat wall face 22 and the wall face 17, lying seamlessly adjacent thereto, of the male mould half 11, but is lower by the amount $\Delta y$, so that the annular gap 16 already mentioned, between the wall face 17 and the wall face 18 of the two mould halves 11 and 12, is formed or remains open.

The mask 21 provided on the wall face 17 of the male mould half 11 in this example embodiment extends horizontally exactly up to the extension 23a of the wall face. 23 of the female mould half 12. If the UV light, in the form of a parallel beam 3 causing the crosslinking, is incident at right angles to the wall face 22 and 17 and parallel to the cylindrical wall face 23, the space located at right angles below the mask 21 is in shadow and only the material located inside the cavity 15, that is inside the imaginary wall extension 23a, is crosslinked, resulting in a clean and burr-free lens rim which does not require any subsequent mechanical processing. If parallel energy radiation is used, therefore, disregarding the diffraction and scattering effects, which are usually negligible in practice, the contour of the mask 21 is transferred two-dimensionally parallel and (in this case) downwards into the rim area of the contact lens. Therefore, if the two mould halves 11 and 12 are separated from one another by the annular gap 16 of height Δy, the rim is formed towards the outside of the area resulting from that displacement by means of the spatial restriction of the energy radiation.

In general, the invention, in one respect, is directed to a reusable mold for making a contact lens, comprising a first mold half having a first mold surface in contact with a lens forming composition and a second mold half having a second mold surface in contact with the lens forming composition, wherein the first mold half and the second mold half are configured to receive each other such that a cavity is formed between the first mold surface and the second mold surface, wherein the cavity defines the shape of a contact lens to be molded, wherein the lens forming composition is polymerizable and/or crosslinkable by a UV radiation, wherein at least one of the mold halves is made from an oxide glass having a Knoop Hardness (HK) less than 345.

Precision optical glass parts are fabricated either through ground and polishing, or press molding processes. Glasses cannot be single point diamond turned to form optical quality surfaces due to significant wear of the diamond tool arising from heat generated during cutting. Over the years, numerous research efforts from both academic and industry were made in machining glasses but failed to identify either a glass family or promising technology that can be successfully machined to form optical property surfaces.

For contact lens fabrication, Alcon's Lightstream™ uses the reusable mold consists of quartz convex base curve and a glass concave front curve. The front curve mold determines lens power, and is made of high precision pressed and polished glass. The fabrication time for new design glass front curve molds is four months. Such long lead-times result in lengthy development cycles and long lead times for prototyping molds. As a result, the Lightstream™ prototype molds are produced with alternate none glass materials to ensure development speed. They are either machinable crystalline materials such as $CaF_2$, or plastics such as CR-39 and polymethylmethacrylate (PMMA). These materials interact with contact lens formulation differently than the glass molds, and introduce process and design risks during scale up to manufacture. Furthermore, these prototype mold materials are less durable and more easily damaged than glass. The use of these prototype mold materials yielded numerous difficulties in today's lens prototyping, and some of these issues are:
1) For plastics, mold dimension shifts over time due to mismatch of material properties between the material and assembly.
2) $CaF_2$ is prone to thermal shock & can be scratched easily.

The invention is partly based on the discovery of machinable glass for optical fabrication industry that enables rapid production of re-usable contact lens molds for prototyping in the Lightstream™ platform. Machinable glasses can reduce the mold production time from four months to 1 week, while reducing the cost by over 50%. The invention is also partly based the discovery that an oxide glass has a Knoop Hardness (HK) less than 350 to form optical quality surfaces with a single point diamond turning process. In this invention, an oxide glass which can form optical quality surfaces with a single point diamond turning process is defined as a machinable optical glass. The discovery of machinable optical glass is an unexpected result since numerous academic and industry research groups have attempted to create an optically smooth machinable glass over the years but have failed. For example, the book "The Properties of Optical Glass" clearly stated "the technical and commercial realization of diamond turning of glass as a production process is very unlikely" (edited by Hans Bach & Norbert Neuroth. Chapter 7 page 248, Second Corrected Printing, Springer-Verlag Berlin Heidelberg)

The present invention discovers a family of machinable oxide glasses and some of the machinable oxide glasses were prototyped and tested as front curve molds for the Lightstream™ platform. More importantly, the machinable glasses have the potential of allowing the seamless transition from prototyping to production because these glasses could be also used to manufacture reusable molds by press molding. Therefore, single point diamond turning is the preferred mold fabrication technique for lens prototyping in order to speed up the lens development, and press molding is for production molds in order to reduce cost. The invention is further partly based on the discovery of a method of single point diamond turning the oxide glass having a Knoop Hardness (HK) less than 350 with a negative or neutral rake angle in order to achieve an optical part having an optical property surface.

"An optical quality surface" refers to a glass mold surface has a surface roughness (Ra) less than 30 nm, preferably less than 20 nm, most preferably less than 10 nm.

"Oxide glass" refers to glass comprises oxide selected from the group consisting of Aluminum oxide, Antimony trioxide, Arsenic trioxide, Barium oxide, Bismuth(III) oxide, Boron trioxide, Calcium oxide, Cerium(III) oxide, Chromium(III) oxide, Gadolinium oxide, Germanium oxide, Iron (III) oxide, Lanthanum oxide, Lead(II) oxide, Lithium oxide, Magnesium oxide, Niobium pentoxide, Phosphorus pentoxide, Potassium oxide, Silicon dioxide, Sodium oxide, Strontium oxide, Sulfur dioxide, Tin dioxide, Titanium dioxide, Zinc oxide, Zirconium dioxide, Tellurium oxide, yttrium oxide and combination therefore.

"Quartz" refers to the second most abundant mineral in the Earth's continental crust, after feldspar. It is made up of a continuous framework of $SiO_4$ silicon-oxygen tetrahedra, with each oxygen being shared between two tetrahedra, giving an overall formula $SiO_2$.

"Fluorine" refers to the chemical element with symbol F and atomic number 9.

"Fluorides" refers to compounds of fluorine.

"Phosphorus" refers to a nonmetallic chemical element with symbol P and atomic number 15.

"Phosphorus oxide" refers to phosphorus pentoxide (phosphorus (V) oxide, phosphoric anhydride), $P_2O_5$, phosphorus trioxide (phosphorus (III) oxide, phosphorous anhydride), $P_2O_3$ and several others, less common, oxides of phosphorus, including $P_4O_7$, $P_4O_8$, $P_4O_9$, PO and $P_2O_6$.

Diamond turning is a process of mechanical machining of precision elements using lathes or derivative machine tools (e.g., turn-mills, rotary transfers) equipped with natural or synthetic diamond-tipped tool bits. The term single-point diamond turning (SPDT) is sometimes applied, although as with other lathe work, the "single-point" label is sometimes only nominal (radiused tool noses and contoured form tools being options). The process of diamond turning is widely used to manufacture high-quality aspheric optical elements from crystals, metals, acrylic, and other materials. Optical elements produced by the means of diamond turning are used in optical assemblies in telescopes, video projectors, missile guidance systems, lasers, scientific research instruments, and numerous other systems and devices. Most SPDT today is done with computer numerical control (CNC) machine tools. Diamonds also serve in other machining processes, such as milling, grinding, and honing.

In principle any material can be machined on a diamond turning machine. However, some materials can be machined with single point diamond and some material cannot be machined with single point diamond. The theory describing which materials can be "diamond turned" considers the electron structure of the metal and is complicated. As a rule of thumb however, most common non-ferrous metals, all plastics, and some crystalline materials like Silicon and Germanium can be cut. However, an amorphous (non-crystalline) solid material glass cannot be diamond turned as discussed above.

The invention directs to a reusable mold for making a contact lens, comprising a first mold half having a first mold surface in contact with a lens forming composition and a second mold half having a second mold surface in contact with the lens forming composition, wherein the first mold half and the second mold half are configured to receive each other such that a cavity is formed between the first mold surface and the second mold surface, wherein the cavity defines the shape of a contact lens to be molded, wherein the lens forming composition is polymerizable and/or crosslinkable by actinic radiation, wherein at least one of the mold halves is made from an oxide glass having a Knoop Hardness (HK) less than 350.

According to the present invention, a lens-forming material refers to any material which can be polymerized and/or crosslinked by actinic radiation to form a contact lens. A preferred group of lens-forming materials are prepolymers which are water-soluble and/or meltable. It would be advantageous that a lens-forming material comprises primarily one or more prepolymers which are preferably in a substantially pure form (e.g., purified by ultrafiltration). For example, prefunctionalised PVA (polyvinyl alcohol) polymer can be a lens forming material. A more preferred group of lens-forming materials is silicone-containing hydrogel. Generally silicone-containing hydrogel comprises at least one components selected from the group consisting of a silicone-containing vinylic monomer, a silicone-containing vinylic macromer, a silicone-containing prepolymer, a hydrophilic vinylic monomer, a hydrophobic vinylic monomer, a crosslinking agent, a free-radical initiator (photoinitiator or thermal initiator), a hydrophilic vinylic macromer/prepolymer, and combination thereof, as well known to a person skilled in the art.

According to the present invention, Knoop Hardness is measured according to International standard ISO 9385: 1990 (E) "Glass and glass-ceramics: Knoop hardness test" Knoop Hardness is used to characterize the hardness of the surface of optical glass against penetration. For this measurement a pyramidal diamond indenter with vertex angles 172°30' and 130°00' and with a rhombic base is applied to the polished specimen surface. Indentation loads of up to 0.9807N are applied for 20 seconds. The size of the resulting indentation is then measured.

Knoop hardness can be computed with the following equation:

$$\underset{\text{hardness}}{\text{Knoop}} HK = 1.451 F/l^2$$

where F (N) denotes the applied load and l (mm) is the length of the longer diagonal of the resulting indentation. According to the International standard ISO 9385:1990 (E), there is no unit for Knoop Hardness (HK). For example: 490 HK 0.1/20 means the Knoop Hardness number 490 HK resulting from an applied test force of 0.9807N. The test force was applied for 20 second.

According to the invention, any oxide glasses that may be considered for the casting moulds are a number of oxide glasses, which however in respect of their Knoop hardness (HK hardness) must be below the value of 350°, preferably less than 340 and more preferably less than 320.

According to the present invention, a preferred group of oxide glass comprises phosphorus oxide from 1% to 60%, preferably from 10% to 40% and substantially free of silicon oxide, and the oxide glass further comprises oxide glass selected from the group consisting of potassium oxide, magnesium oxide, calcium oxide, strontium oxide, barium oxide, titanium oxide, zinc oxide, aluminum oxide and a combination thereof. According to the present invention, substantially free of silicon oxide refers to less than 1%, preferably less than 0.8%, more preferably less than 0.5% silicon oxide. The oxide glass may still further comprise fluorine and/or fluoride. A preferred group of oxide glass having Knoop hardness (HK hardness) below the value of 350 is commercially available, for example S-FPL51, S-FPL53 (available from Ohara), N-FK51A, N-PK53 (available from Schott) and FCD1, FC100 (available from Hoya).

The processes which may be considered for the production of glass moulds may be a number of techniques, for example precision glass moulding and single point diamond turning. Precision glass moulding is a replicative process that allows the production of high precision optical components from glass with or without grinding and polishing. The process is also known as ultra-precision glass pressing. It is used to manufacture precision glass lenses for consumer products such as digital cameras, and high-end products like medical systems. The main advantage over mechanical lens production is that complex lens geometries such as aspheres can be produced cost-efficiently.

The precision glass moulding process consists of six steps:
1. The glass blank is loaded into the lower side of the moulding tool.
2. Oxygen is removed from the working area by filling with nitrogen and/or evacuation of the process chamber.
3. The tool system is nearly closed (no contact of the upper mould) and the entire system of mould, die and glass is heated up. Infrared lamps are used for heating in most systems.
4. After reaching the working temperature, which is between the transition temperature and the softening point of the glass, the moulds close further and start pressing the glass in a travel-controlled process.

5. When the final thickness of the part has been achieved, the pressing switches over to a force-controlled process.
6. After moulding has been completed, the glass is cooled down and the working environment is filled with nitrogen. When the lens has cooled to the point where it can be handled, it is removed from the tool.

Precision glass moulding process is economical when mass production is required. But when the production requirement is small, then the moulding process is not economical. When the objective is to produce lenses from an inorganic amorphous glass with high dimensional accuracy and small in number it is applied the machining process as final operation. In this case, diamond turning is expected to be economically viable to produce the optical parts from inorganic amorphous glass using Single Point Diamond Turning machine.

In diamond turning, the intended shape and surface produced depend on machine tool accuracy and other machining parameter. The main machining parameters are tool feed rates, spindle speed and depth of cut. The tool feed rate is normally expressed in terms of either distance travelled by the tool per unit time (mm/min) or distance travelled per unit rotation (mm/revolution). It is most common to see the distance per revolution as it is directly related to the anticipated theoretical surface finish. Rake angle is a parameter used in various cutting and matching processes, describing the angle of the cutting face relative to the work. There are two rake angles, namely the back rake angle and side rake angle, both of which help to guide chip flow. There are three types of rake angles: positive, negative, and neutral angle (i.e. zero angle). If the leading edge of the blade is ahead of the perpendicular, the angle is, by definition, negative. A rake angle is positive when the blade is behind the perpendicular. Generally, positive rake angles: a) make the tool more sharp and pointed. This reduces the strength of the tool, as the small included angle in the tip may cause it to chip away, b) reduce cutting forces and power requirements, c) helps in the formation of continuous chips in ductile materials, and d) can help avoid the formation of a built-up edge. By contrast, negative rake angles: a) make the tool more blunt, increasing the strength of the cutting edge, b) increase the cutting forces, c) can increase friction, resulting in higher temperatures, d) can improve surface finish. A zero rake angle is the easiest to manufacture, but has a larger crater wear when compared to positive rake angle as the chip slides over the rake face.

If the leading edge of the blade is ahead of the perpendicular, the angle is, by definition, negative.

The invention, in another respect, relates to a method for making an optical part comprising the steps of:

(a) selecting an oxide glass material having a Knoop Hardness (HK) less than 350, (b) single point diamond turning the inorganic amorphous glass with a neutral or negative rake angle to achieve an optical part having an optical quality surface.

According to the present invention, optical part refers to not only a reusable mold, but also a wide application for optical industry, in particular the ophthalmic areas, imaging optics, telecommunication areas, and integrated optics for use of fibre optics in telecom, sensor, and computer technology. In addition, other application areas for UV or IR transmission, as well as radiation shielding applications (windows), and glass for eye protection as in the case of welding protection and filters.

According to the present invention, rake angles for SPDT the oxide glass to achieve optical surface with a neutral or negative rake angle, preferred ranges from 0 to −25°. For example, for SPDT the oxide glass FCD100 & S-FPL53 glass, the rake angle is set at 0°. For SPDT the oxide glass L-BBH1, N-FK51A, FCD1, P-PK53, the rake angle is set at −25°.

Surface roughness, often shortened to roughness, is a measure of the texture of a surface. It is quantified by the vertical deviations of a real surface from its ideal form. If these deviations are large, the surface is rough; if they are small the surface is smooth. Roughness is typically considered to be the high frequency, short wavelength component of a measured surface. There are many different roughness parameters in use, but $R_a$ is by far the most common. Amplitude parameters characterize the surface based on the vertical deviations of the roughness profile from the mean line. Many of them are closely related to the parameters found in statistics for characterizing population samples. For example, $R_a$ is the arithmetic average of the absolute values and $R_t$ is the range of the collected roughness data points. Ra means the value obtained by the following formula and expressed in micrometer (μm) when sampling only the reference length from the roughness curve in the direction of the mean line, taking X-axis in the direction of mean line and Y-axis in the direction of longitudinal magnification of this sampled part and the roughness curve is expressed by y=f(x):

$$Ra = \frac{1}{l}\int_0^l \{f(x)\}dx$$

Areal roughness parameters are defined in the ISO 25178 series. The resulting values are Sa, Sq, Sz. At the moment many optical measurement instruments are able to measure the surface roughness over an area. According to the present invention, the surface roughness refers to Ra surface roughness.

The following is a description of the lathe setup and process used at the present invention to produce optical surfaces on glass utilizing single point diamond turning technology.

Cutting was performed on an Optoform 80 ultra-precision lathe manufactured by Precitech Inc, utilizing Contour natural diamond tool inserts.

Spindle speed is the speed set on the machine in RPM which rotates the substrate being lathed or cut. The processing speed for diamond turning glass will range between 4500-5500 RPM in a clockwise rotation.

Rough-Cut Depth is the amount of material removed in the first part of the cutting sequence. Here the parts general shape is formed on the material. The depth is set on the machine and in general for optical tooling it will be set in the micron range (0.000 mm). For the diamond turning of glass the range for the rough cut should not exceed 0.035 mm.

Finish-Cut Depth is the amount of material removed that will produce a smooth high finish optical surface. The depth is set on the machine and will not usually exceed 0.010 mm. The finish cut depth for diamond turning, glass is 0.002 mm or less.

Rough-Cut Feedrate is the speed the diamond tool travels across the surface of the part being lathed. The speed for this cut is normally faster and is set on the machine. Setting for this parameter when turning glass will be 15 mm/min.

Finish-Cut Feedrate is the speed the diamond tool travels across the surface of the part being lathed during the final step or cut of the process. The speed for this cut is considerably lower than the rough-cut. Slowing the speed produces the high quality surface which is defined as an optical surface. For turning glass this speed will range from 6.5 mm/min or slower.

Cutting Fluid or coolant is a steady mist of fluid applied to the surface of the part being machined. This fluid keeps the surface cool preventing friction which will result in poor surface quality. Also this mist stream helps remove cutting debris build up at the cutting point of the diamond tool. For cutting glass we use odorless mineral spirits manufactured by Hubbard Hall Corporation.

In addition to diamond rake angle, other SPDT conditions which are machine design parameters and are not changeable are provided as follows:
Spindle Speed—2000 RPM
Rough Cut Feedrate—20 mm/min
Rough Cut Depth—0.000800 mm
Finish Cut Feedrate—15 mm/min
Finish Cut Depth—0.00050 mm
Metrology: Nominal Radius—8.803
Sag—4.693
Mold radius is a defined measurement of a curve that makes a concave or convex mold surface. This measurement is unique to the optical design to deliver contact lens performance requirements. The measurement is taking utilizing the Fisba Optik FS10M interferometer.
Molds sag is a measurement taking in the Z-axis from a pre-determined point to the apex of a convex or concave surface. This measurement is defined by design and is critical in determining the lens edge and center thickness. Mold Sag or justify distance is measured using the Nikon VMR-3020.

Regarding to an optical quality surface, in addition to surface smooth, pitting is main issue, Pitting is a crater like defect that is formed on the surface of a diamond turned mold. It usually occurs when lathing a material such as glass in which the removed material produces a chip instead of coming off in a string like pattern often referred to as swarf. Glass due to its hardness puts more stress on the diamonds cutting radius which dulls its sharpness. This in turn will cause a material to rip or pull off instead of cutting which in most cases results in surface pitting as well as produce a haziness defined as lathing burn.

Standard visual inspection for surface quality was performed using a Leica S6E microscope to identify random surface defects to include pitting, lathing burn, or scratching.

The surface quality is also measured using the VEECO NT 9100 White Light Interferometer which takes multiple high magnification surface scans at the mold center to determine surface roughness. This measurement is displayed using a nanometer scale. According to the above present invention, optical surfaces on usable glass mold utilizing single point diamond turning technology has a surface roughness (Ra) less than 30 nm, preferably less than 20 nm and more preferably less than 10 nm. Even though a high surface finish less than 10 nm is achieved using SPDT a light cosmetic polishing or buffing is required to achieve optimum surface finish. This process consists of using a matching radius polishing lap and polishing cloth. Applying a diamond paste polishing compound to the polishing tool while rotating the part using a variable speed rotating axial polishing system will remove the mold of SPDT features to include lathe lines and small surface defects. The level of surface polishing removal is determined by using weights applied to the polishing tool against the mold surface for a determined time.

According to the invention, the materials that may be considered for the casting moulds are a number of oxide glasses, which however in respect of their Knoop hardness (HK hardness) must be below the value of 350.

Table 1 lists the KH hardness of various glasses and whether the glass can be SPDT, whereby the data values are taken from the Material safety data sheet (MSDS) from suppliers: Schott, Hoya and Ohara.

TABLE 1

| Supplier | Oxide glass Grade | HK | $T_g$ (° C.) | λ (W/mK) | Single point diamond turnable |
|---|---|---|---|---|---|
| Schott | N-B270 | 542 | 533 | 0.86 | Not (N) |
| Schott | N-FK5 | 520 | 466 | 0.925 | N |
| Schott | N-PK52A | 355 | 467 | 0.73 | N |
| Schott | N-FK51A | 345 | 464 | 0.76 | Yes (Y) |
| Schott | P-PK53 | 335 | 383 | 0.64 | Y |
| Hoya | LBC3N | 300 | 544 | 0.443 | Y |
| Hoya | FCD1 | 345 | 457 | 0.837 | Y |
| Hoya | FCD10 | 360 | 441 | 0.733 | N |
| Hoya | FCD100 | 310 | 404 | 0.867 | Y |
| Ohara | S-FPL53 | 320 | 426 | 0.857 | Y |
| Ohara | S-FPL51 | 350 | 458 | 0.780 | N |
| Ohara | L-PHL 1 | 350 | 347 | 0.627 | N |
| Ohara | L-PHL 2 | 370 | 381 | 0.683 | N |

Table 2A (immediate below) lists the composition (formula) of various glasses, whereby the data values are taken from the Material safety data sheet (MSDS) from supplier: Ohara.

| | | Manufacture | | | |
|---|---|---|---|---|---|
| | | Ohara | Ohara | Ohara | Ohara |
| | | Grade | | | |
| | Formula | S-FPL51 | S-FPL53 | L-PHL1 | L-PHL2 |
| Lithium Oxide | $Li_2O$ | | | 0-2 | 0-2 |
| Sodium Oxide | $Na_2O$ | | | 2-10 | 2-10 |
| Potassium Oxide | $K_2O$ | | 0-2 | | 2-10 |
| Magnesium oxide | MgO | 2-10 | 2-10 | | |
| Calcium Oxide | CaO | | | | 2-10 |
| Strontium Oxide | SrO | 10-20 | 10-20 | | |
| Barium Oxide | BaO | 0-2 | | 2-10 | 0-2 |
| Lanthanum Oxide | $La_2O_3$ | | | 0-2 | 0-2 |
| Titanium Oxide | $TiO_2$ | | | | |
| Zirconium Oxide | $ZrO_2$ | | | | |
| Niobium pentoxide | $Nb_2O_5$ | | | | |
| Zinc Oxide | ZnO | | | 30-40 | 20-30 |
| Gadolinium oxide | $Cd_2O_3$ | | | | |
| Boron oxide | $B_2O_3$ | | | 0-2 | 0-2 |
| Aluminum oxide | $Al_2O_3$ | 2-10 | 0-2 | 0-2 | 2-10 |
| Silicon oxide (silica) | $SiO_2$ | | | | 0-2 |
| Germanium Oxide | $GeO_2$ | | | | |
| Tellurium oxide | $TeO_2$ | | | | |
| Lead oxide | $PbO_2$ | | | | |
| Phosphorous oxide | $P_2O_5$ | 20-30 | 2-10 | 40-50 | 50-60 |
| Arsenic Trioxide | $As_2O_3$ | | | | |
| Antimony Trioxide | $Sb_2O_3$ | | | 0-2 | 0-2 |
| Bismuth oxide | $Bi_2O_3$ | | | | |
| Yttrium oxide | $Y_2O_3$ | | | | |
| Sodium fluoride | NaF | | | | |
| Fluorine | F | | 0-2 | | |
| Potassium bifluoride | $KHF_2$ | | 0-2 | | |
| Magnesium fluoride | $MgF_2$ | 2-10 | 2-10 | | |
| Calcium fluoride | $CaF_2$ | 10-20 | 20-30 | | |
| Strontium Fluoride | $SrF_2$ | 20-30 | 20-30 | | |

-continued

| | | Manufacture | | | |
| | | Ohara | Ohara | Ohara | Ohara |
| | | | Grade | | |
| | Formula | S-FPL51 | S-FPL53 | L-PHL1 | L-PHL2 |
|---|---|---|---|---|---|
| Barium fluoride | $BaF_2$ | 10-20 | 10-20 | | |
| Yttrium fluoride | $YF_3$ | | 2-10 | | |
| Ammonium fluoride | $NH_4F$—HF | | 0-2 | | |
| Aluminum Fluoride | $AlF_3$ | 10-20 | 20-30 | | |
| Barium fluoride | $BaCl_2$ | | | | |

Table 2B (below) lists the composition (formula) of various glasses, whereby the data values are taken from the Material safety data sheet (MSDS) from suppliers: Schott, and Hoya.

| | | Manufacture | | | | | | | |
| | | Schott | Schott | Schott | Schott | Schott | Hoya | Hoya | Hoya |
| | | | | | Grade | | | | |
| | Formula | N-B270 | N-FK5 | P-PK53 | N-FK51A | N-PK52A | FCD1 | FCD100 | LBC3N |
|---|---|---|---|---|---|---|---|---|---|
| Lithium Oxide | $Li_2O$ | | | | | | | | |
| Sodium Oxide | $Na_2O$ | 1-10 | | 10-20 | | | | | |
| Potassium Oxide | $K_2O$ | 1-10 | 10-20 | 10-20 | | | | | |
| Magnesium oxide | MgO | | | | 1-10 | 1-10 | | | |
| Calcium Oxide | CaO | 1-10 | | | 1-10 | 1-10 | | | |
| Strontium Oxide | SrO | | | | 10-20 | 10-20 | | | |
| Barium Oxide | BaO | 1-10 | | 1-10 | 10-20 | 10-20 | 10-20 | 1-10 | 50-60 |
| Lanthanum Oxide | $La_2O_3$ | | | | | | | | |
| Titanium Oxide | $TiO_2$ | | <1 | | | | | | |
| Zirconium Oxide | $ZrO_2$ | | | | | | | | |
| Niobium pentoxide | $Nb_2O_5$ | | | | | <1 | | | |
| Zinc Oxide | ZnO | | | 1-10 | | | | | |
| Gadolinium oxide | $Cd_2O_3$ | | | | | | | | |
| Boron oxide | $B_2O_3$ | | 10-20 | | | | | | |
| Aluminum oxide | $Al_2O_3$ | | | 10-20 | 10-20 | 10-20 | <1 | | 1-10 |
| Silicon oxide (silica) | $SiO_2$ | 50-60 | 60-70 | | | | | | |
| Germanium Oxide | $GeO_2$ | | | | | | | | |
| Tellurium oxide | $TeO_2$ | | | | | | | | |
| Lead oxide | $PbO_2$ | | | | | | | | |
| Phosphorous oxide | $P_2O_5$ | | | 50-60 | 10-20 | 10-20 | 20-30 | 1-10 | 40-50 |
| Arsenic Trioxide | $As_2O_3$ | | | | | | | | |
| Antimony Trioxide | $Sb_2O_3$ | <1 | <1 | <1 | <1 | | | | |
| Bismuth oxide | $Bi_2O_3$ | | | | | | | | 0-1 |
| Yttrium oxide | $Y_2O_3$ | | | | | | | | |
| Sodium fluoride | NaF | | | | | | | | |
| Fluorine | F | | | 1-10 | 20-30 | 20-30 | | | |
| Potassium bifluoride | $KHF_2$ | | | | | | | | |
| Magnesium fluoride | $MgF_2$ | | | | | | 5-10 | 1-10 | |
| Calcium fluoride | $CaF_2$ | | | | | | 10-20 | 20-30 | |
| Strontium Fluoride | $SrF_2$ | | | | | | 20-30 | 20-30 | |
| Barium fluoride | $BaF_2$ | | | | | | | 1-10 | |
| Yttrium fluoride | $YF_3$ | | | | | | 1-5 | 1-10 | |
| Ammonium fluoride | $NH_4F$—HF | | | | | | | | |
| Aluminum Fluoride | $AlF_3$ | | | | | | 10-20 | 30-40 | |
| Barium fluoride | $BaCl_2$ | | | | | | | 0-1 | |

The table 1 shows that the Knoop Hardness (KH hardness) for N-FK51A, P-K53 (from Schott), FCD1, FCD100 and LBC3N (from Hoya) and S-FPL53 (from Ohara) lower than 350. It has been shown that the above oxide glasses can be machined using SPDT to produce optical property surface. Otherwise those oxide glasses having Knoop hardness (HK hardness) higher than 350 cannot be machined using SPDT to produce optical property surface.

According to a further concept of the invention, it is advantageous to select an oxide glass that contains fluorine and/or fluoride compound. It is also advantageous to select an oxide glass that contains phosphorous oxide. Those oxide glasses contain fluorine, fluoride, phosphorous oxide and combinations thereof can be machined using SPDT to produce optical quality surface.

What we claim is:

1. A reusable mold for making a contact lens, comprising a first reusable mold half having a first mold surface in contact with a lens forming composition and a second reusable mold half having a second mold surface in contact with the lens forming composition, wherein the first reusable mold half and the second reusable mold half are configured to receive each other such that a cavity is formed between the first reusable mold surface and the second reusable mold surface, wherein the cavity defines the shape of a contact lens to be molded, wherein the lens forming composition is polymerizable and/or crosslinkable by an actinic radiation, wherein at least one of the reusable mold halves is made from an oxide glass having a Knoop Hardness (HK) less than 350.

2. The reusable mold of claim 1, wherein the Knoop Hardness is less than 340.

3. The reusable mold of claim 2 wherein the Knoop Hardness is less than 320.

4. The reusable mold of claim 1, wherein the reusable mold has a surface roughness (Ra) less than 30 nm.

5. The reusable mold of claim 4, wherein the reusable mold has a surface roughness (Ra) less than 10 nm.

6. The reusable mold of claim 1, wherein the oxide glass is substantially free of silicon oxide.

7. The reusable mold of claim 6, wherein the oxide glass comprises 1% to 60% phosphorous oxide.

8. The reusable mold of claim 7, wherein the oxide glass further comprises 20% to 30% fluorine.

* * * * *